US012119463B2

United States Patent
Hanisch

(10) Patent No.: US 12,119,463 B2
(45) Date of Patent: *Oct. 15, 2024

(54) RECYCLING METHOD FOR TREATING USED BATTERIES, IN PARTICULAR RECHARGEABLE BATTERIES, AND BATTERY PROCESSING INSTALLATION

(71) Applicant: DUESENFELD GMBH, Wendeburg (DE)

(72) Inventor: Christian Hanisch, Braunschweig (DE)

(73) Assignee: DUESENFELD GMBH, Wendeburg (DE)

( * ) Notice: Subject to any disclaimer, the term of this patent is extended or adjusted under 35 U.S.C. 154(b) by 593 days.

This patent is subject to a terminal disclaimer.

(21) Appl. No.: 16/343,224

(22) PCT Filed: Oct. 12, 2017

(86) PCT No.: PCT/EP2017/076113
§ 371 (c)(1),
(2) Date: Apr. 18, 2019

(87) PCT Pub. No.: WO2018/073101
PCT Pub. Date: Apr. 26, 2018

(65) Prior Publication Data
US 2019/0260101 A1    Aug. 22, 2019

(30) Foreign Application Priority Data

Oct. 20, 2016  (DE) ..................... 10 2016 120 046.8

(51) Int. Cl.
*H01M 10/54*    (2006.01)
*C22B 1/00*     (2006.01)
(Continued)

(52) U.S. Cl.
CPC ............. *H01M 10/54* (2013.01); *C22B 1/005* (2013.01); *C22B 7/00* (2013.01); *C22B 7/001* (2013.01);
(Continued)

(58) Field of Classification Search
CPC ......... H01M 10/54; H01M 6/52; C22B 1/005; C22B 7/00; C22B 7/001; Y02P 10/20; Y02W 30/84
See application file for complete search history.

(56) References Cited

U.S. PATENT DOCUMENTS 3,671,318 A    6/1972   Moe
4,118,219 A   10/1978   Elmore et al.
(Continued)

FOREIGN PATENT DOCUMENTS

CA    2983768 A1   11/2016
CN    1438729 A     8/2003
(Continued)

OTHER PUBLICATIONS

Dehnert et al: "Vacuum Distillation", Allgemeine Chemie, 14.3, p. 14, 1979.
(Continued)

*Primary Examiner* — Stephen J Yanchuk
(74) *Attorney, Agent, or Firm* — WC&F IP

(57) ABSTRACT

The invention relates to a method for treating used lithium batteries (10) containing the steps: comminuting the batteries (10) such that comminuted material (24) is obtained, and (b) inactivating of the comminuted material (24) such that an inactive comminuted material (42) is obtained. According to the invention, the drying is conducted at a maximum pressure of 300 hPa and a maximum temperature of 80° C. and the deactivated comminuted material (42) is not filled into a transport container and/or said deactivated comminuted
(Continued)

Figure 1:
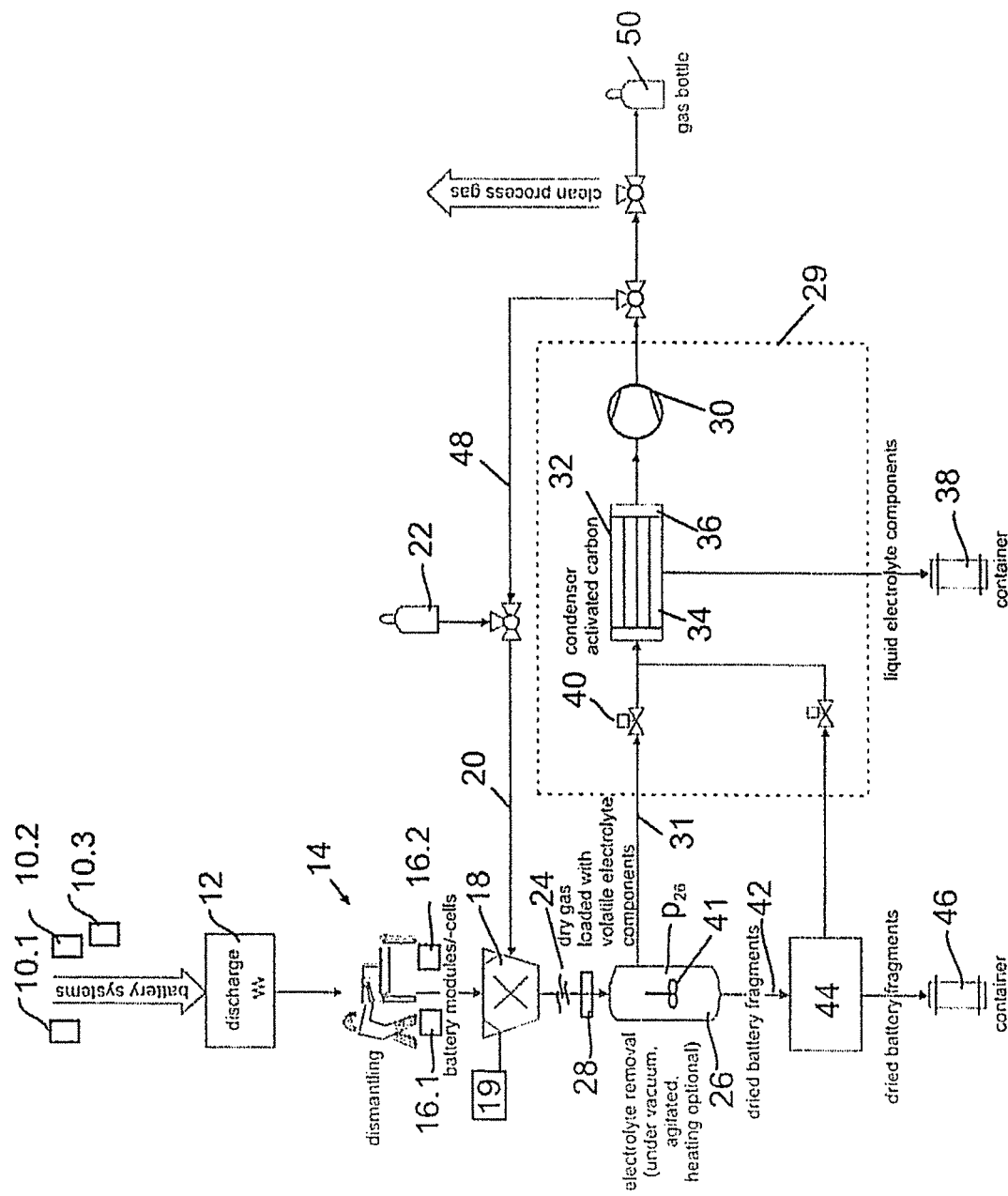

material is immediately further processed after the drying process.

14 Claims, 4 Drawing Sheets

(51) Int. Cl.
*C22B 7/00* (2006.01)
*H01M 6/52* (2006.01)

(52) U.S. Cl.
CPC .............. *H01M 6/52* (2013.01); *Y02P 10/20* (2015.11); *Y02W 30/84* (2015.05)

(56) References Cited

U.S. PATENT DOCUMENTS

| | | | |
|---|---|---|---|
| 4,357,215 A | 11/1982 | Goodenough | |
| 5,303,872 A * | 4/1994 | Milewits | B09B 3/00 241/100 |
| 5,632,863 A | 5/1997 | Meador | |
| 6,447,669 B1 | 9/2002 | Hanisch et al. | |
| 6,524,737 B1 | 2/2003 | Tanii et al. | |
| 7,101,425 B2 | 9/2006 | Kiss | |
| 7,192,564 B2 * | 3/2007 | Cardarelli | H01M 6/52 75/693 |
| 8,210,456 B2 | 7/2012 | Stevens | |
| 9,450,277 B2 | 9/2016 | Dunagan et al. | |
| 9,509,025 B2 | 11/2016 | Iida | |
| 9,780,419 B2 | 10/2017 | Hanisch | |
| 9,843,077 B2 | 12/2017 | Hayashi et al. | |
| 10,396,408 B2 | 8/2019 | Shin et al. | |
| 11,050,097 B2 | 6/2021 | Hanisch et al. | |
| 2003/0186110 A1 | 10/2003 | Sloop | |
| 2005/0241943 A1 | 11/2005 | Kakuta et al. | |
| 2010/0230518 A1 | 9/2010 | Ewles et al. | |
| 2014/0017621 A1 * | 1/2014 | Iida | H01M 10/54 432/13 |
| 2014/0290438 A1 | 10/2014 | Hanisch | |
| 2016/0043450 A1 | 2/2016 | Sloop | |
| 2016/0045841 A1 * | 2/2016 | Kaplan | B01D 3/06 429/49 |
| 2016/0049699 A1 * | 2/2016 | Hayashi | C01F 11/22 44/387 |
| 2016/0372802 A1 * | 12/2016 | Chiang | H01M 6/52 |
| 2018/0013181 A1 * | 1/2018 | Ho | H01M 10/0525 |
| 2018/0366740 A1 * | 12/2018 | Muska | C22B 47/00 |

FOREIGN PATENT DOCUMENTS

| | | |
|---|---|---|
| CN | 101394015 A | 3/2009 |
| CN | 102496752 A | 6/2012 |
| CN | 103959553 A | 7/2014 |
| CN | 103259062 B | 9/2015 |
| CN | 105552470 A | 5/2016 |
| DE | 4424825 A1 | 1/1996 |
| DE | 10118961 B4 | 8/2006 |
| DE | 60 2005 001 937 T2 | 5/2008 |
| DE | 10 2011 110 083 A1 | 2/2013 |
| DE | 10 2012 024 876 A1 | 6/2014 |
| DE | 10 2015 207 843 A1 | 11/2016 |
| EP | 0794587 A2 | 9/1997 |
| EP | 1041659 A1 | 10/2000 |
| EP | 1760821 A1 | 3/2007 |
| EP | 2741357 A1 | 6/2014 |
| JP | H06338352 A | 12/1994 |
| JP | 2000243396 A | 9/2000 |
| JP | 2001012704 A | 1/2001 |
| JP | 2005011698 A | 1/2005 |
| JP | 2005515605 A | 5/2005 |
| JP | 2005197149 A | 7/2005 |
| JP | 2007531977 A | 11/2007 |
| JP | 2008204755 A | 9/2008 |
| JP | 2013004299 A | 1/2013 |
| JP | 2013229326 A | 11/2013 |
| JP | 2015028928 A | 2/2015 |
| JP | 2016512165 A | 4/2016 |
| KR | 20040071776 A | 8/2004 |
| KR | 20060101683 | 3/2005 |
| KR | 10-0665626 B1 | 1/2007 |
| WO | 2010/102377 A1 | 9/2010 |
| WO | 2010/149611 A1 | 12/2010 |
| WO | 2013023640 A1 | 2/2013 |
| WO | 2016/164752 A1 | 10/2016 |
| WO | 2016174156 A1 | 11/2016 |

OTHER PUBLICATIONS

Herausgeber: "Florke/Wolff Kursthemen Chemis—Allgemeine und Phsyikalische Chemie", "(Course Issues Chemisty—General and Physical Chemistry)", 1985.

Higgelke: "Infinite Power Solutions stellt papierdunnen Akku vor", "(Infinite Power Solution presents paper-thin Battery)", Jun. 6, 2012.

VDMA—Norm 24351 Trocknungstechnik (VDMA=German Engineering Federation; VDMA Standared 24351—Drying Technology—Basic terms and definitions), Sep. 1999.

Wolf et al: Allgemeine und Physikalische Chemie, Chemie, 1985.

Carolo-Wilhelmina University of Technology in Braunschweig Final report "Joint project as part of the "Renewably Mobile funding program of the Federal Ministry for the Environment, Nature Conservation, Building and Nuclear Safety, Jul. 1, 2012-Mar. 31, 2016.

Kwade, A. et al., "LithoRec Recycling von Lithium-Ionen-Batterien " LithoRec, 2012.

Perry, R. & Green, D., "Perry's Chemical Engineer's Handbook, Seventh Edition", 1997.

Vacuum Technology; Terms and Definitions; General Terms. DIN 28400-1, German Institute for Standards e.V., 1990.

* cited by examiner

RECYCLING METHOD FOR TREATING USED BATTERIES, IN PARTICULAR RECHARGEABLE BATTERIES, AND BATTERY PROCESSING INSTALLATION

The invention refers to a method for the treatment of used batteries, in particular used lithium batteries, such as lithium ion batteries, with the steps (a) comminuting the batteries such that comminuted material is obtained, (b) inactivating of the comminuted material such that an inactive comminuted material is obtained.

According to a second aspect, the invention refers to a battery processing installation for the treatment of used batteries, in particular for the treatment of used lithium batteries with (a) a comminuting device for comminuting the batteries such that comminuted material is obtained, and (b) an inactivation device for inactivating the comminuted material.

US 2005/0241943 A1 describes a method for processing used batteries in which the batteries are heated prior to a comminuting step, thereby destroying plastic components in the batteries. The disadvantage of this type of procedure is that the remaining components of the batteries may be contaminated with degradation products of the plastic.

DE 10 2012 024 876 A1 describes a system for transferring transport-critical electrolyte cells, in which they are initially comminuted under inert gas and then dusted with a deactivation powder so as to prevent the electrochemically active material from spontaneously combusting. The disadvantage of this is that the resulting material still poses a comparatively high hazard potential and that the dusting power itself poses a risk of exposure and that the formation of a flammable and explosive atmosphere in the transport container cannot be ruled out.

DE 10 2011 110 083 A1 describes a method for recovering active material from a galvanic cell, in which the galvanic cells are initially mechanically comminuted, then pre-dried and subsequently sifted. Finally, the binder is broken down in an oven.

This type of device is very well-suited to the efficient recycling of larger amounts of galvanic elements. However, for partial load operation, the construction of this installation is comparatively complex. It has also been proven that highly toxic fluoroorganic compounds and hydrogen fluoride may form, the disposal of which is highly complex.

WO 2010/102377 A1 describes a method in which the batteries to be recycled, such as lithium batteries, are heated in a rotary kiln and the resulting gases are sucked away. The disadvantage of this method is that it is difficult to reuse the electrolyte and it produces large quantities of hydrogen fluoride and fluoro-organic compounds.

The post-published publication WO 2016/174156 A1 describes a method in which used batteries are first locally deactivated and placed in a transport container. Following the transport of the comminuted material to a central processing plant, the deactivated cell fragments are processed further.

The invention aims to reduce disadvantages of the prior art.

The invention solves the problem by way of a method according to the preamble in which the drying is conducted at a maximum pressure of 300 hPa, preferably at least in part at 50 hPa, and at a maximum of 80° C. In particular, the deactivation is conducted at least also by drying the comminuted material. According to a second aspect, the invention solves the problem by way of a battery processing installation according to the preamble, wherein a vacuum installation is connected to the drying device in order to generate a vacuum of at least 300 hPa in the drying device, and the drying device is configured to dry at a maximum temperature of 80° C.

The advantage of the invention is that the amount of electrolyte that can be obtained from the comminuted material through drying is such that an electrochemical reaction is no longer possible, or only to a negligibly small extent. In addition, no flammable or explosive gas phase forms above the battery fragments, as the organic carbonates of the electrolyte that have a low boiling point have been removed [from the fragments]. The comminuted material is therefore largely inert and can be safely transported or processed further, especially if it is packed under vacuum.

A further advantage is that no additional material has to be added to deactivate the comminuted material. This decreases the complexity of the battery processing, reduces the weight of the deactivated comminuted material and increases the purity in the subsequent separation and recycling steps. In particular, in potential subsequent hydrometallurgical processing steps, a high degree of product purity without foreign ions is advantageous.

It is also advantageous that the formation of relevant quantities of fluorophosphates, hydrogen fluoride, carbon monoxide, polyfluorinated dibenzodioxins and dibenzofurans, nitrogen oxides, carbonyl fluoride and/or hydrogen cyanide can be ruled out. Fluorophosphates are often strong neurotoxins, the formation of which must be reliably prevented. Furthermore, due to the low electrolyte content, it is guaranteed that a self-amplifying and intensifying build-up of heat triggered by an electrochemical reaction cannot occur. It has been proven that hydrogen fluoride and fluorophoshate can form in significant quantities at comparatively low temperatures of over 80° C.

Furthermore, it is advantageous that the removal of the electrolyte is possible without expending a considerable amount of energy. The electrolyte can also be largely reused.

The condensation of the vaporised electrolyte, as intended according to a preferred embodiment, also leads to a low-emission recycling of lithium batteries.

The battery processing installation according to the invention enables material recycling rates of over 80%, which is not possible with current installations.

Within the scope of the present description, the term drying should be understood particularly to mean the removal of at least one solvent in the conducting salt. In particular, the drying is executed such that at least 90 percent by weight of dimethyl carbonate and/or ethyl methyl carbonate is removed.

A lithium battery should to understood particularly to mean a rechargeable battery whose electrochemical reaction involves lithium and/or lithium ions and/or a lithium compound.

A battery processing installation should also be understood particularly to mean a rechargeable battery processing installation for processing rechargeable batteries.

The transport container should also be understood particularly to mean transport packaging. The transport packaging is preferably sealed by way of a vacuum seal. Aluminium composite foil is especially well-suited as transport packaging.

The comminution unit should be understood especially to mean a device which, when operating, comminutes the batteries. For example, the comminution unit (i) is a pressure comminution unit whereby the batteries are crushed between two tool surfaces, (ii) a striking comminution unit whereby the batteries lie on a tool surface and are smashed by striking them with a second moveable tool, (iii) a cropping comminution unit whereby the batteries are comminuted by two tool surfaces that move in opposite directions, (iv) a cutting comminution unit whereby the batteries are cut into two parts by means of two blades and/or (v) an impact comminution whereby the batteries are thrown against a wall, impact against a moving tool or two particles collide. Of course, the comminution unit may also work by way of two or more of the named comminution mechanisms.

According to a preferred embodiment, the comminution unit forms part of a comminuting device which comprises a container in which the comminution unit is arranged.

The given temperatures and pressures always relate to the atmospheric temperature in the respective device. In this way, the characteristic that the drying occurs at a maximum pressure of 300 hPa and at a maximum of 80° C. should be understood particularly to mean that the temperature of the atmosphere in the dryer is a maximum of 80° C. It is irrelevant that the local temperature may be higher.

It is beneficial if the drying occurs after the comminuting of the batteries. It is indeed possible and represents a preferred embodiment that the batteries are exposed to a vacuum when in an uncomminuted state such that at least parts of the electrolyte vaporise, wherein the resulting gas either escapes through a safety valve in the rechargeable battery or the battery is destroyed by the pressure difference between the external environment and the internal pressure, enabling the vaporising electrolyte to escape. However, since the electrolyte is predominantly located between tightly wound or stacked and pressed layers of electrodes and separators and in their pores, and it is connected to other components of the batteries, this procedure can be very time-consuming. It is thus often more beneficial and represents a preferred embodiment of the invention for the batteries to be mechanically comminuted, for example through cutting, cropping, impact, cutting and/or crushing. This means that a larger interface is available for the transition of materials into the gas phase.

The drying process is preferably conducted at a maximum pressure of 30 hPa for at least 50% of the drying time. Alternatively or additionally, a minimum pressure during the drying process is at most 50 hPa. This allows for the removal of a very large proportion of the electrolyte. The minimum pressure should be understood especially to mean the lowest atmospheric pressure in the drying device that is maintained for at least one minute.

According to a preferred embodiment, it is also possible for the drying to occur at the same time as the comminuting. In other words, a vacuum with a maximum pressure of 300 hPa is attached to a comminuting device in which the batteries are comminuted. The advantage of this is that the mechanical energy introduced during comminuting supports the vaporising of the electrolyte. It is therefore not necessary to introduce additional thermal energy into the comminuted material in order to vaporise the electrolyte (although this is possible and included in the invention). Furthermore, it is not necessary to cool the comminuted material during comminuting (although this is possible and included in the invention). The comminution unit also effects a circulation of the comminuted material, which accelerates the drying process.

It is favourable if the drying occurs while the comminuted material is being agitated and/or circulated. This results in the separation of the galvanic elements, which consist of anode, separator and cathode. An obstruction of the vaporising process by way of foils which stick together is prevented. Mechanical energy is introduced for the separation of current collector foil and coating, and the resulting frictional heat feeds the vaporising heat into the system.

Prior to being comminuted, the used batteries are preferably dismantled. This means that larger battery systems are dismantled into their smaller subcomponents, the modules or stacks, or even that the cells which contain the electrochemically active material are separated from the control electronics. The control electronics comprise, for example, semiconductor elements and/or sensors and are responsible for the charge control of the batteries.

The drying occurs under a vacuum. According to its most general configuration, the invention solves the problem by means of a method according to the preamble, wherein the vacuum is selected to be so large that the pressure is below the vapour pressure of dimethyl carbonate at 80° C., in particular at 70° C. However, it is especially beneficial if the drying occurs at a maximum pressure of 300 hPa, in particular a maximum of 100 hPa. At such low pressures, considerable parts of most electrolytes vaporise, especially dimethyl carbonate and ethyl methyl carbonate, and do so at temperatures of less than 80° C. The advantage of low temperatures is that the formation of hydrogen fluoride and fluoro-organic compounds is hindered. Both pose a potential risk for the battery processing installation and the surroundings. It is therefore beneficial to prevent their development.

The drying preferably occurs at a temperature that is lower than a decomposition temperature. The decomposition temperature should be understood particularly to mean the lowest temperature at which at least 80 percent by mass of the binder of the lithium batteries has decomposed into gaseous components after keeping the comminuted material at this temperature for an hour. The decomposition temperature can be measured by successively increasing the temperature of the comminuted material and recording when a loss of mass occurs, especially through the build-up of gas due to a decomposition of the binder, and the specified criteria is fulfilled. If necessary, the experiment must be conducted several times, each time using a new sample of comminuted material at an increased temperature.

According to a preferred embodiment, the method comprises the condensation of the gases which result from the drying process. This preferably occurs at ambient pressure, whereby a deviation of ±50 hPa is possible. It is beneficial if the temperature during condensation is at least 0° C. This reduces the required cooling capacity and prevents the formation of ice. The cooling capacity is preferably at least 4 kilowatts and at most 40 kilowatts relative to one tonne of processed batteries per hour. Alternatively, the temperature upon condensation is lower than 0° C., such that water is removed from the atmosphere through the formation of ice. It is possible that the condenser has two or more zones of varying temperature. In this case, the temperature in one of the two zones is so high that no ice forms and so low in another zone that water is separated as ice.

It is favourable if the maximum temperature upon condensation is at most 50° C., preferably a maximum of 30° C., in particular a maximum of 20° C. This means that the organic carbonates in the batteries can be almost completely recovered. Moreover, virtually no emissions are produced and the amount of energy required for condensation is low.

The comminuting of the batteries is preferably executed such that at least 90% by weight of the components of the comminuted material has a maximum sieve size of 50 mm, in particular a maximum of 30 mm, preferably a maximum of 20 mm. This should be understood to mean that 90% by weight of the components fall through a sieve which has a mesh width of 50 mm (or the respective given width). This type of comminuting avoids micro short circuits, thereby increasing the level of safety of transport, storage and further processing.

It is favourable if the drying occurs under an atmosphere in which the partial pressure of the water is lower than 50 Pa, in particular lower than 10 Pa. A low partial pressure of the water leads to a low reaction rate of lithium compounds to lithium hydroxide and thus only to a low build-up of hydrogen. This prevents the formation of flammable hydrogen-oxygen mixtures and contributes to the safety of the installation.

In addition, it is favourable if the partial pressure of oxygen upon drying has a maximum value of 30 millibars, especially a maximum value of 10 millibars. This largely inhibits the reaction of oxygen with oxidisable components of the batteries. It is possible to achieve the low partial pressure of oxygen by means of drying at a low pressure. Alternatively or additionally, the drying may occur in an inert gas atmosphere.

According to a preferred embodiment, the method comprises the steps of a continuous recording of a water vapour concentration during comminuting and/or drying, and a reduction of the water vapour concentration when a pre-determined threshold value is exceeded. The water vapour concentration should be understood especially to mean a proportion of water vapour in relation to the entirety of the atmospheric components. In particular, the water vapour concentration should also be understood to mean a partial water vapour pressure. For instance, the reduction of the water vapour concentration may comprise a decrease in the pressure and/or a supply of inert gas. The threshold value for the water vapour concentration is preferably selected such that, below the threshold value, a formation of significant quantities of hydrogen fluoride through decomposition of the conducting salt, such as $LiPF_6$, and a significant reaction of the water with metallic lithium is impossible. These criteria are met at a dew point of $-40°$ C. It is possible, but not necessary, for the water vapour concentration to be measured directly, for instance by spectroscopy, especially infrared spectroscopy. It is also possible, for example, to identify the sum of the concentrations of inert gas, oxygen and organic compounds and assume that the rest is made up of water vapour.

According to a preferred embodiment, the method comprises the steps of a continuous recording of a oxygen concentration during comminuting and/or drying, and a reduction of the oxygen concentration when a pre-determined threshold value is exceeded. The oxygen concentration should be understood especially to mean a proportion of oxygen in relation to the entirety of the atmospheric components. In particular, the oxygen concentration should also be understood to mean a partial oxygen pressure. The reduction of the oxygen concentration may comprise, for example, a decrease in the pressure and/or a supply of inert gas. The threshold value for the oxygen concentration is preferably selected such that an explosion is impossible below the threshold value. It is possible, but not necessary, for the oxygen concentration to be measured directly, for instance using a Nernst probe, a lambda probe, paramagnetic sensors or a resistive probe. It is also possible, for example, to determine the concentration of the oxygen by measuring gases in air that are accompanied by oxygen, such as carbon dioxide by assuming that the same mixing ratio of oxygen is present in the measured gas as in the air.

In particular, the method comprises the steps (i) continuous monitoring of a concentration of organic carbonates in the atmosphere of the drying device during drying and (ii) completion of the drying when a lower explosion limit is no longer reached. The lower explosion limit is the concentration of organic components for which the following applies: following the filling of a container with the comminuted material in air with a temperature of $23°$ C., under 1013 hPa and at 80% humidity, an ignition does not cause an explosion but does lead to a higher concentration. If this lower explosion limit is still reached, the drying continues.

The concentration of inert gas is preferably set at at least 90% by weight, in particular at least 95% by weight, preferably at least 97% by weight. The measurement of the concentration is preferably done, for example, spectroscopically.

Alternatively or additionally, a progress parameter is recorded which describes the progress of the drying, and the drying is completed when the progress parameter reaches a pre-determined progress parameter threshold value. The progress parameter is small at the beginning of the drying and increases with the progression of the drying. An equivalent situation is for the progress parameter to be large at the beginning of the drying and to decrease with the progression of the drying.

For instance, the progress parameter is the concentration of a gaseous electrolyte in the gas which has been sucked out. In this situation, it is possible, but not necessary, to directly measure the concentration of a gaseous electrolyte, in particular organic carbonates, for instance by spectroscopy, especially infrared spectroscopy. Alternatively or additionally, it is possible that the progress parameter is the condensate flow (measured, for example, in volume, mass, weight or quantity of substance per time unit) of condensed gas components in an available condenser. Alternatively, the progress parameter is the pressure in the drying container or the gas flow out of the drying container. If a pump output is constant, the pressure only depends, in good approximation, on the drying progress and the temperature of the comminuted material. If the electrolyte has largely been vaporised, the pressure decreases. The gas flow also reduces.

According to a preferred embodiment, the comminuted material is further processed immediately after the drying process. In particular, the comminuted material is not put in a transport container after drying. In particular, the comminuted material is transported after drying by means of a continuously or discontinuously feeding conveyor for further processing, for example a separating device. In particular, the conveyor is connected to the dryer such that it is dust-tight. Examples of a continuously feeding conveyor are dust-tight tube chain conveyors, preferably with two adjustable outlet slides, conveyors, conveyor troughs, screw conveyors, bucket conveyors or semi-continuous conveyors.

A method is preferred in which the drying of the comminuted material is only completed if, after the completion of the drying process, no flammable or explosive gas mixture can form above the comminuted material that has been filled [in the container] and/or when the comminuted material is so dry that no flammable or explosive gas mixture can emerge in the transport container or during the subsequent processing. The property that the drying is completed if, after the completion of the drying process, no flammable or explosive gas mixture can form above the comminuted material that has been filled [in the container] should be understood particularly to mean that, within the space of one week at $50°$ C. and 1013 hPa, no flammable gas mixture forms in a transport container in the form of a 50 litre container that has been half-filled (relative to its volume) with the comminuted material. Preliminary tests determine whether the criteria has been fulfilled. If a flammable gas mixture does form, the drying must be conducted for a longer time and/or at a lower pressure. The preliminary tests are repeated until a drying time and/or drying pressure has been identified at which, in a set of tests of three transport containers, the requirements for the property have been fulfilled for all three transport containers.

The comminuted material is preferably dried until an electrolyte content in the comminuted material is so low that an electrochemical reaction is impossible. In other words, the electrolyte content is lower than a threshold value, the threshold value being selected such that, if this threshold value is not achieved, the cell voltage is reduced to a maximum of one quarter. This threshold value is determined, for example, by defining the cell voltage of a battery in relation to the electrolyte content. Shortly before achieving the threshold value, the cell voltage collapses, i.e. it decreases by at least 75%. If the threshold value is not achieved, the battery contains so little electrolyte that, to a good approximation, an electrochemical reaction is no longer possible.

The comminuted material is preferably dried for so long that a 50 kg amount of comminuted material, which is contained in a compacted form in a 50 litre drum, does not experience a build-up of heat, or the build-up of heat is so low that a thermal runaway, i.e. a thermally induced chain reaction, is ruled out for at least two months, and that any build-up of gas is also so low that after two weeks, no excess pressure occurs if a negative pressure of 500 hPa is present to begin with.

It is beneficial if the comminuted material is dried until the electrolyte content of organic components that are volatile at 50° C. has a maximum value of 3% by weight, in particular a maximum of 2% by weight, especially preferably a maximum of 1.5% by weight.

The drying is preferably conducted for so long that the accumulated content of organic carbonates from the electrolyte that are volatile at 80° C. falls short of 3% by volume in the atmosphere above the comminuted material.

In particular, the drying is conducted until the dimethyl carbonate content is lower than 4% by volume, especially 3% by volume, and/or the cyclohexylbenzene content is lower than 1% by volume, in particular 0.5% by volume.

The drying preferably occurs immediately after comminution. This should be understood to mean that the time between the beginning of the comminution of the batteries and the point at which at least a part of the resulting comminuted material begins to dry is a maximum of five minutes, especially a maximum of one minute. The rapid drying after comminution means that the mass of material that may potentially experience an electrochemical reaction remains small; the electrochemical reaction time of potential exothermic reactions also remains small. This reduces the risk for the installation and the surroundings.

According to a preferred embodiment, the comminuted material is moved in the drying device, especially when removing it from the drying device, by means of an agitator. The agitator may refer to a comminution unit; however, this is not necessary. The agitator serves in particular to prevent blockages and/or thermal energy from entering the comminuted material and/or to separate the layered foils, meaning that the vaporisation of the electrolyte is not sterically hindered. In addition, the mechanical energy input effects an at least partial detachment of the coating from the current collector foils. This results in more surfaces of the coating fragments becoming free, which benefits the drying process and facilitates the subsequent separation of coating and foils. The agitator preferably exhibits a power output of at least 1 kW per cubic metre of drying volume. It is beneficial if the agitator has at least one stirring blade, which is arranged such that it moves the comminuted material upwards.

The agitator is preferably used to supply at least 35%, in particular at least 50%, of a vaporisation heat required for the drying of the comminuted material. In other words, in an ideal situation, it is not necessary to provide an additional heater to heat the comminuted material. If such a heater is provided, its power output is preferably smaller than the power output of the agitator. The introduction of energy into the comminuted material by way of an agitator is advantageous as it results in the separation of, for example, coating and carrier foil and other components of the battery.

The agitator preferably has a power output of at least 1 kilowatt per cubic meter of volume of the drying device.

The drying device preferably has a heater which draws heat from the heat dissipation of the at least one vacuum pump and/or of the condenser. The condensation of the electrolyte in the condenser results in condensation heat. Consequently, a temperature of at least 60° C. may be present in the condenser. The heat is transferred, for example, by means of a heat transfer fluid, in particular a gas or a liquid. For instance, the heat transfer fluid is used to heat an exterior wall of the drying device.

An independent subject of the present invention is a method for treating used lithium batteries with the steps (a) comminuting of the batteries, such that comminuted material is obtained, and (b) drying of the comminuted material, such that the battery electrolyte vaporises, wherein (c) at least 50% of the heat required for vaporisation is introduced into the comminuted material by means of mechanical energy. In particular, the mechanical energy is introduced into the comminuted material by means of a comminution unit and/or an agitator. It is especially beneficial if the drying is conducted at a maximum pressure of 300 hPa and a maximum of 80° C.; however, this is not necessary. The preferred embodiments presented in the description refer to this aspect of the invention.

The comminution and drying are preferably executed in a single container, especially in the comminution unit. In other words, the comminution and drying occur simultaneously under negative pressure in a single container. The advantage of this situation is that the mechanical energy, which is supplied for comminution and converted into thermal energy, is absorbed during the vaporisation of the electrolyte and discharged in this form. This means that, on the one hand, an excessive heating of the comminuted material is prevented; on the other hand, there is no need for a heater to conduct the drying.

It is especially favourable if the vacuum of a maximum absolute pressure of 300 hPa is generated by a jet pump. Jet pumps are largely resistant to aggressive gases that are due to be pumped, particularly if the appropriate blasting medium is selected. It is beneficial if the blasting medium, which is a fluid, has a pH value of at least 8, in particular of at least 9, for example at least 12. In this case, unwanted components of the gas that is being pumped can decompose or react to become less damaging substances. In this way, for example, dimethyl carbonates and/or ethyl methyl carbonates can be broken down by a saponification reaction. Any hydrogen fluoride contained in the blasting medium can be converted in the alkaline environment into a non-hazardous salt by way of an acid-base reaction.

The jet pump fluid preferably contains a substance that precipitates fluoride. For example, the jet pump fluid may contain sodium carbonate, potassium carbonate or calcium carbonate. The salts that result from the reaction with a fluorine compound, in particular hydrogen fluoride, are preferably separated, in particular filtered or removed by sedimentation. This at least largely prevents hydrogen fluoride or other poisonous fluorine compounds from being emitted into the surroundings.

The drying preferably occurs at a maximum temperature of 80° C.: this produces almost no hydrogen fluoride. This increases the service life of the battery processing installation and reduces the environmental risk.

According to a preferred embodiment, the method comprises the steps of condensing components of the electrolyte by cooling and/or increasing the pressure such that an electrolyte condensate occurs. For example, the condensation is conducted at a point that lies between the dryer and the vacuum pump relative to the flow of gas. In this case, gases coming from the dryer must initially pass through a condenser before reaching the vacuum pump. This causes the gaseous electrolyte in the gas, which is produced during the drying, to be at least largely separated in the condenser before the remaining gas reaches the pump. Electrolyte can be recovered in this way. In addition, the flow of gas through the vacuum pump decreases, which increases its [the vacuum pump's] service life and reduces its energy consumption.

According to a preferred embodiment, the method alternatively comprises the step of purifying the gas through the adsorption of the volatile organic components of an activated carbon filter in front of or behind the compressor unit.

Alternatively or additionally, the method according to the invention preferably comprises the step of purifying the gas produced during the drying before it reaches the vacuum pump. This may also occur, for example, by the gas through passing an activated charcoal filter and/or a filter that contains substances which react with hydrogen fluoride, such as a calcium salt like calcium carbonate or a potassium salt such as potassium carbonate.

High temperature drying, during which the binder decomposes, is preferably conducted such that the resulting decomposition gases do not mix with the gases resulting from low temperature drying. It is possible that the high temperature drying and the low temperature drying occur at different pressures. For example, the high temperature drying can be executed at normal pressure.

The active material should be understood to mean the material that reacts electrochemically during operation of the batteries. The carrier for the active material should be understood particularly to mean a carrier foil to which the active material is applied in the form of particles. For example, the carrier foil refers to a foil made of aluminium or an aluminium alloy. The binder is the material which binds the active material with the carrier; for example, the binder contains polyvinylidene fluoride.

It is beneficial if liquid nitrogen is added when comminuting the batteries. This cools the comminuting machine and the comminuting material, and also drives oxygen and water vapour out of the atmosphere.

It is beneficial if the comminution occurs at a dew point of −40° C. and/or when a partial pressure of the oxygen is a maximum of 40 hPa, especially a maximum of 15 hPa.

According to a preferred embodiment, the method comprises the steps of detaching hard parts and/or separating active material from the carrier, particularly via a second comminuting stage and/or air jet sieving, thereby producing an active material fraction and a carrier fraction; and a separate packing of the active material fraction and carrier fraction in suitable transport containers. It is beneficial if these transport containers are designed to be airtight. By separating an active material fraction and a carrier fraction, transportation generally does not require any permits. An additional advantage is that fractions separated in this way only pose a small risk.

The removal of the comminuted material from the transport container is preferably conducted under vacuum and/or shielding gas.

It is possible, but not necessary, for the the transport container to be filled with communited material under vacuum. It is beneficial if the transport container is a vacuum container, in particular an evacuated vacuum container, such that a negative pressure or vacuum occurs in the transport container once it has been sealed. Alternatively, the transport container may be filled with an inert gas.

According to a preferred embodiment, the method is conducted such that a pressure lower than 100 hPa is maintained for at least one minute.

In a preferred battery processing installation, the separation unit and the drying device are arranged in a joint standard container. The advantage of this is that it renders the battery processing installation especially easy to transport.

The drying device is configured to dry the comminuted material until an electrolyte content is so low that an electrochemical reaction is impossible. If the drying device is operated in batch mode, which represents a preferred embodiment, the drying shall be performed, for example, for a pre-determined period of time. Alternatively or additionally, the content of organic substances, such as organic carbonates, in the atmosphere in the drying device is continually measured and the drying stopped once the concentration is lower than a pre-determined threshold concentration.

According to a preferred embodiment, the battery processing installation, in particular the vacuum installation, comprises a condenser that is configured to condense organic components of the atmosphere in the dryer, especially organic carbonates such as dimethyl carbonate, ethyl methyl carbonate and/or ethylene carbonate. The condenser may also be described as a condensation device or a plasticizer. The condenser is preferably arranged in the direction of material flow behind a vacuum pump, by means of which the dryer is evacuated. It is beneficial if the condenser is cooled, preferably to a maximum temperature of 90° C., preferably a maximum of 80° C., especially preferably a maximum of 70° C. In order to keep the energy required for cooling low, the condenser, insofar as it is cooled, is cooled to a temperature of at least −10° C., in particular at least 10° C.

It is beneficial if the drying device comprises an agitator, for example an anchor agitator or a rod agitator, whose stirring rods can be arranged transversely to an agitator shaft. Alternatively or additionally, the agitator is an external agitator that moves the dryer as a whole.

The battery processing installation has a vacuum installation that is connected to the drying device for the purpose of generating a vacuum in the drying device. It is especially favourable if the vacuum installation is also arranged in the standard container. The standard container preferably refers to a container that conforms to ISO standard 668, preferably a 40 foot container or a 20 foot container.

For example, the vacuum installation comprises a jet pump with a blasting medium that is used to generate the negative pressure.

It is beneficial if the comminuted unit is arranged in the drying device. In other words, in this case a container is present in which the batteries are both comminuted and in which the comminuted material is dried. Both processes occur at the same time and under a vacuum. An agitator is not necessary in this case.

The battery processing installation preferably has a hard metal detachment device and/or a light fraction separation device; a separation device, especially a classification device, for separating active material from the carrier, in particular by means of a second comminution stage and/or air jet sieving, such that an active material fraction and a carrier fraction occur; and preferably a second filling device for the separate filling of the active material fraction and the carrier fraction. It is beneficial if this filling device is designed, however, to be at least dust-tight for the purpose of filling under negative pressure and/or inter gas.

A hard metal detachment device should be understood particularly to mean a device for detaching fragments of peripheral components of the operating system, the battery cell casing and the electrical contacts. For example, the hard metal detachment device has a magnet separation device and/or a separator, in particular a cross-flow separator and/or a zigzag separator. The separation device should be understood particularly to mean a device for detaching the separator foil.

The light fraction separation device preferably has a zigzag separator and/or an air separator, wherein it is favourable if the air is conducted within a circuit. This reduces the exposure of the environment to harmful dust.

The second filling device and the separation devices are preferably arranged in a joint standard container, for example in the first standard container described above or a second standard container. It is beneficial if the container is sealed so as to be dust-tight.

The battery processing installation preferably has an airlock between the comminution unit and the deactivation device, especially the drying device. For example, this refers to a rotary feeder or a flat slider. The airlock reduces the amount of gas introduced into the deactivation device, especially the drying device. The airlock is preferably designed to be a rotary airlock. This renders it possible to empty the inactivation unit during operation of the comminution unit.

If the comminution and drying are conducted in different containers, the battery processing installation preferably has a dust-tight, in particular a gas-tight, conveyor that connects the comminuting device and the drying device. A conveyor is deemed particularly dust-tight if a maximum of 5% by weight of all particles with a diameter of at least 0.1 micrometres leave the conveyor into the atmosphere.

In order to reduce the drying time between the beginning and end of the drying process, it is beneficial if the drying device comprises a heater. The heater may refer to a conductive or convective heater that preferably introduces the heat produced during compression into the pumps and the condensation heat into the dryer.

It has been proven that the quality of the recovered electrolyte is especially high when the drying device comprises at least one dry-running vacuum pump, preferably exclusively dry-running vacuum pumps.

At 300 hPa, the pump output of the vacuum installation is at least fifty times the volume of the interior of the drying device per hour. This means that the drying time can be kept short.

The drying time can also be reduced if—as is intended with a preferred embodiment—the drying device has at least two vacuum pumps which differ in their flow rate at 400 hPa and their maximum possible minimum pressure. In this case, one of the two vacuum pumps preferably has a high flow rate capacity (measured in litres per second at 400 hPa) but a lower minimum pressure. The maximum possible minimum pressure is the lowest pressure that can be achieved with the pump. It is then possible to use the pumps in their optimal operating ranges. The first pumps, arranged in the direction of material flow, guarantee a high flow rate at low pressures, whereas pumps arranged downstream compress smaller flow rates against ambient pressure.

For example, the vacuum installation has at least one dry-running roots pump and/or at least one dry-running screw vacuum pump.

The comminution unit preferably has a bottom sieve for restricting the maximum size of the comminuted material. This facilitates the further processing of the comminuted material and reduces the risk of a subsequent heating and spontaneous combustion of the comminuted material through short-circuiting of battery fragments. The bottom sieve preferably has a maximum mesh width of 35 mm.

The drying device preferably has an entry valve for supplying it (the drying device) with inert gas; this entry valve is connected to an inert gas supply device for feeding an interior of the drying device with inert gas. In particular, liquefied inert gas, i.e. gaseous at 22° C. and 1013 hPa, is supplied, wherein this gas has a maximum temperature of −30° C. Alternatively or additionally, the comminuting device has a supply valve that serves the same purpose; this supply valve is connected to an inert gas supply device for feeding an interior of the comminuting device with inert gas. The inert gas supply device preferably serves to supply liquefied inert gas.

In order to measure an oxygen concentration, especially to determine whether an explosion limit has been exceeded, the comminution unit has an oxygen detection device for detecting an oxygen concentration in the comminution unit.

The battery processing installation may have a combustion device for the thermal or catalytic combustion of gaseous components of the electrolyte. This is preferably arranged behind the condenser in the direction of material flow and/or in front of an exhaust outlet. This means that no components of the electrolyte are released through the exhaust outlet into the atmosphere.

The battery processing installation preferably comprises a particle removal device for removing particles from the gas flow that is drawn out of the drying device. The particle removal device may comprise, for example, a cyclone and/or a filter and/or activated carbon.

In the following, the invention will be explained in more detail by way of the attached drawings. They show FIG. 1 a flow diagram of a method according to the invention, FIG. 2 a cross-section through a battery processing installation according to the invention and FIG. 3 a cross-section through further optional components of a battery processing installation according to the invention.

Figure 4:
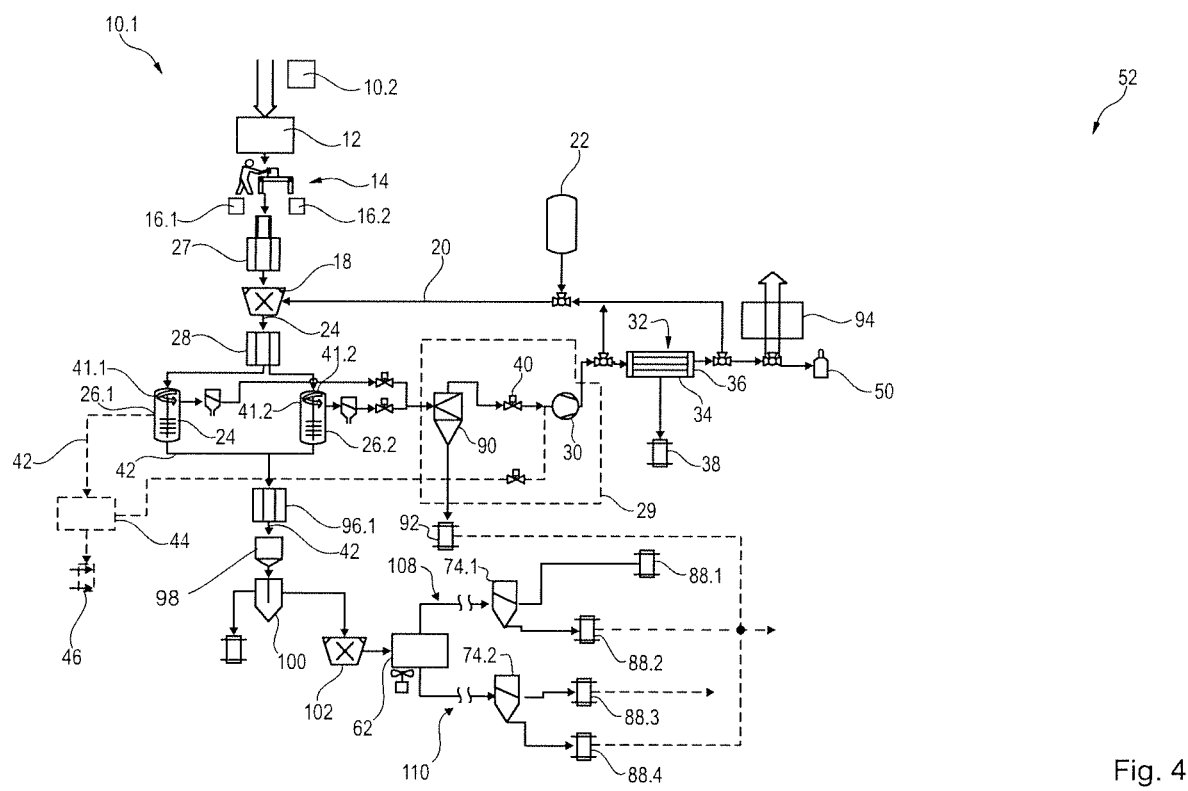

FIG. 4 shows a flow diagram of a method according to the invention according to a second embodiment.

FIG. 1 shows a flow diagram of a method according to the invention. Batteries 10.1, 10.2, . . . , in particular battery systems made up of several battery modules or battery stacks, which are in turn made up of several battery cells, are initially discharged in a discharge unit 12. This is followed by the dismantling of the batteries 10 at a dismantling station 14, if this is necessary because the battery systems cannot otherwise be delivered into the comminution unit for geometric or gravimetric reasons. In order to do this, the battery systems are opened and dismantled to the point at which the modules/stacks can be individually removed. If required, the cells can also be separated from the drive electronics. The resulting sub-units (modules/stacks) and/or cells 16.1, 16.2, . . . are fed into a comminution unit 18, which comprises, for example, a rotary shear with a rotor and a comminutor with stators or several rotors, or a cutting mill with a rotor and several rotors.

The comminution unit 18 comminutes the batteries 10 under shielding gas 20, which is extracted, for example, from a shielding gas cylinder. Alternatively or additionally, liquid nitrogen from a liquid nitrogen source 19 may be may be injected. The shielding gas may refer, for example, to nitrogen, a noble gas, carbon dioxide, nitrous oxide or another gas which is preferably not toxic.

Comminuted material 24 is produced during the comminuting; the material is fed into an inactivation device in the form of a drying device 26. An airlock 28 is arranged between the comminution unit 18 and the drying device 26, the airlock being so gas-tight that the pressure device 26 is—to a good approximation—separated from the comminution unit 18 so as to be gas-tight.

The drying device 26 is connected to a vacuum installation 29 that comprises a vacuum pump 30 and creates a vacuum. A pressure $p_{26}$ from $p_{26} \approx 100$ hPa, at times below 50 hPa, is present in the drying device 26. It should be noted that, within the scope of the present description, the vacuum pump should be understood particularly generally to mean a device that creates a vacuum. It is possible and preferred, but not necessary, for the vacuum pump to simultaneously work as a compressor, such that gas is emitted from it under a pressure that is greater than the ambient pressure.

In the case depicted in FIG. 1, the vacuum pump is a compressor which sucks in and compresses gas 31 that is present in the drying device 26. Alternatively or additionally, the vacuum installation 29 may have a jet pump which uses a blasting medium in the form of a liquid that is conducted at a high speed through Venturi nozzles. The blasting medium is alkaline and has a pH value of at least pH 1 and is, for example, a 10% potassium hydroxide solution.

The vacuum installation 29 comprises a gas purification device 32 that is arranged between the drying device 26 and the vacuum pump 30, and which has a condenser 34 and/or an activated carbon filter 36 in the present case. The condenser is operated at a temperature of −10° C. so that dimethyl carbonate and ethyl methyl carbonate condense and can be dispensed into a condensate container 38. In addition, any water present is separated by freezing. A control valve 40 is designed to open when the pressure $p_{26}$ becomes too great and to close when the pump circuit and drying container are to be decoupled.

The drying material is preferably moved during drying. This may be achieved via agitating with an agitator 41, such as an anchor agitator or a rod agitator with rods arranged perpendicular to the agitator shaft. Alternatively, it can be achieved by way of a drying container that is moved.

The drying of the comminuted material results in deactivated comminuted material 42, which is fed into a filling device 44. A transport container 46 is then filled with the deactivated comminuted material 42 under vacuum and/or shielding gas. The transport container 46 is preferably gas-tight. It is possible, but not necessary, for the transport container 46 to be filled with inert gas prior to transportation such that it is under normal pressure. Alternatively, it is also possible for the transport container to be sealed under vacuum and transported. It is possible that, instead of the transport container, a vacuum-sealed foil is selected, such as an aluminium compound foil.

The comminution unit 18 is fed with shielding gas 20 from the vacuum pump 30 via a flushing line 48. If the vacuum pump 30 also functions as a compressor—as in the present case—which represents a preferred embodiment, the shielding gas can be drawn over a pressurised gas cylinder 50. Alternatively or additionally, the shielding gas 20 can be given off into the surroundings, following additional cleaning if necessary.

Figure 2:
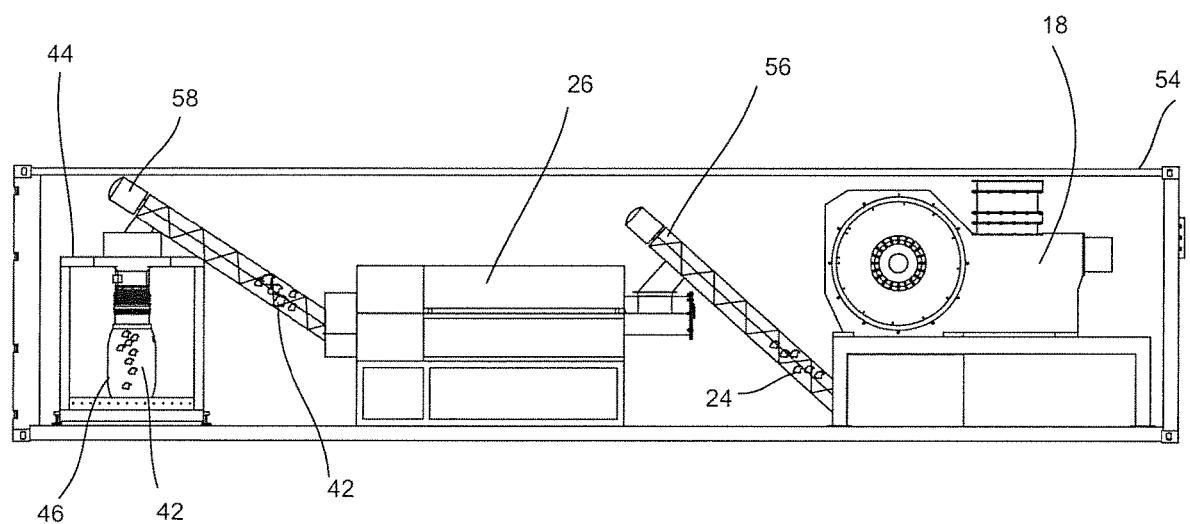

FIG. 2 schematically depicts a cross-section through a battery processing installation 52 according to the invention (see FIG. 1), which comprises a standard container 54 in which the comminution unit 18, the drying device 26 and the filling device 44 are arranged. A first gas-tight conveyor 56 is arranged behind the comminution unit 18; the conveyor comprises, for example, a screw conveyor or a tube chain conveyor. The first conveyor 56 delivers the comminuted material 24 to the drying device 26, which is connected to the vacuum generation device, not depicted in FIG. 2. A second conveyor 58 is arranged behind the drying device 26 in the direction of material flow; preferably, the conveyor is also designed to be gas-tight and may include a screw conveyor or a tube chain conveyor. The second conveyor delivers the inactivated comminuted material 42 to the filling device 44.

Figure 3:
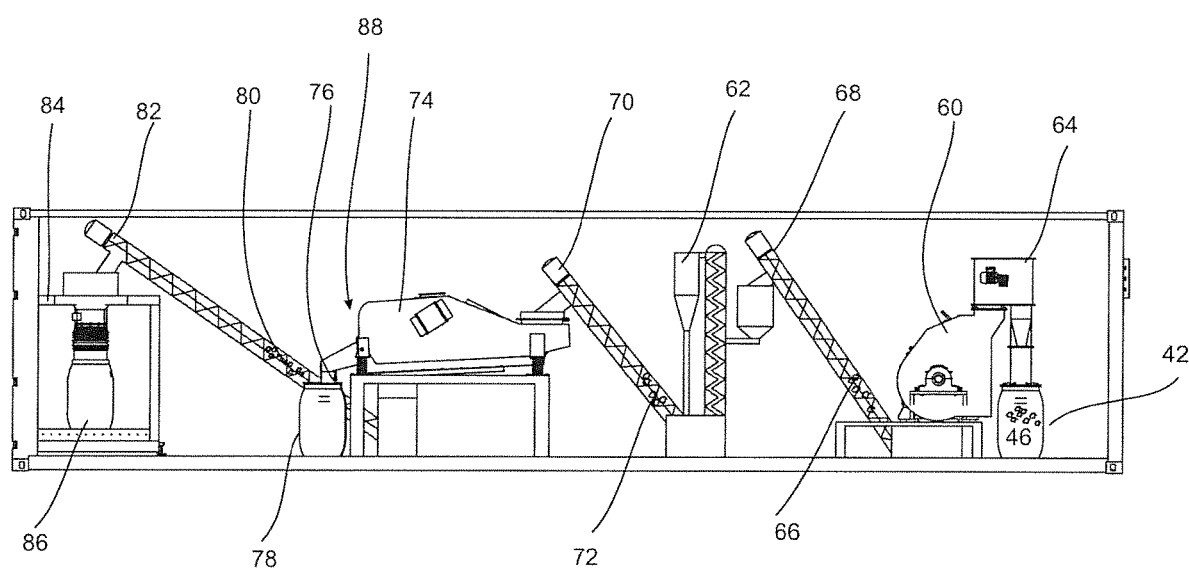

FIG. 3 depicts optional units—available in the present embodiment—of the battery processing installation 52 according to the invention (see FIG. 1) which comprise a breakdown comminutor 60, as well as a separator 62. The breakdown comminutor 60 contains a transport container draining device 64, by means of which inactivated comminuted material 42 can be removed from the transport container 46. The breakdown comminutor 60 produces breakdown material 66, which is fed into the separator 62. The separator may refer, for example, to a zigzag separator.

The battery processing installation 52 preferably comprises a comminutor, which is preferably situated in the material flow in front of the classification device 74 and includes a rapid comminution tool, wherein a peripheral speed of the rotor is greater than 1 m/s, preferably greater than 10 m/s. This comminutor comminutes the comminuted material and subjects it to such mechanical stress that the electrochemically active coating at least partially detaches from the carrier. The presence of such a comminutor is a generally preferred feature of a battery processing installation according to the invention.

A light fraction with a separator foil and fine coating material, and a heavy material fraction with carrier foils (aluminium and copper) with an easy-adhesive coating occur in the separator. Both fractions are each placed on a sieve for further separation into coating and separator foil, or coating and metal foil. The further processing of the resulting fractions is conducted separately.

The breakdown material 66 is fed to the separator 62 by means of a third conveyor 68. A fourth conveyor 70 guides sifted material 72, in particular the material of the light fraction and the material of the heavy fraction, which leaves the separator 62, into one or two classification devices 74. The classification device 74 preferably has an air jet sieve, which simultaneously functions as a separation device in the case of the heavy fraction for separating the active material from the carrier. In the case of the light fraction, the active material is separated by the separator. The separation results in an active material fraction 76, with which a transport container 78 is filled.

In addition, a carrier fraction (heavy material) 80 and a separator fraction (light material) are produced, which—in the present embodiment—are fed into a filling unit 84 using a fifth conveyor 82; the filling unit fills a container 86 with the carrier fraction 80. The filling unit 84 comes together with a second filling unit 88 to form part of a second filling device.

FIG. 4 depicts a flow diagram of a second battery processing installation 52 according to the invention, which has two drying devices 26.1, 26.2. Each drying device 26.1, 26.2 has an agitator 41.1 or 41.2. The airlock 27 is located in front of the comminution unit 18 in the flow of material direction, wherein the airlock is designed as a rotary airlock in the present case and can be used to fill the comminution unit 18 without the gas atmosphere in the comminutor mixing with the surrounding air. The airlock 28 is located behind the comminution unit 18 in the direction of material flow, wherein the airlock is designed as a rotary airlock in the present case and can be used to feed the drying devices 26.1, 26.2 one-by-one or simultaneously.

Each agitator 41.1, 41.2 has a power output of at least 4 kW, in the present case 5 kW, per cubic metre of drying volume. The mechanical energy that is introduced is transferred to the comminuted material 24 contained in the respective drying device 26.1, 26.2. Part of the mechanical energy leads to the separation of components of the comminuted material, for example to a separation of coating material from the carrier foil. However, the mechanical output is largely converted into thermal energy. This thermal energy is absorbed by the vaporising electrolyte, which is still a component of the comminuted material 24.

The gases that develop in the drying devices 26.1 (i=1, 2) are first cleaned of particles that have been picked up; this is done by means of a particle removal device 90. The particles are collected in a container 92 or immediately processed further. The particle removal device 90 may refer, for example, to a filter and/or a cyclone.

The vacuum pump 30 is arranged behind the particle removal device 90 in the direction of flow. It is beneficial if at least a second pump of a different design is arranged behind or parallel to the vacuum pump 30 in the direction of gas flow.

The condenser 34, in which a pressure $p_{34}$ is present, is arranged behind the vacuum pump 30. For the most part, the pressure $p_{34}$ corresponds to the ambient pressure, i.e. it deviates from the ambient pressure by a maximum of 100 hPa, for instance. Given that the pressure $p_{34}$ is considerably greater than the pressure $p_{26}$ in the drying devices 26.1, 26.2, the carboxylic acids in particular, especially dimethyl carbonate, propylene carbonate, diethyl carbonate, ethylene carbonate and ethyl methyl carbonate, condense. The resulting condensation heat is discharged by cooling. In this situation, it is possible that the condenser is cooled to a temperature of $T_{34}$, which differs from the ambient temperature $T_{Umg}$ by less than 20 Kelvin. This has the advantage that the amount of energy required for drying the comminuted material 24 is comparatively low and a lot of electrolyte can be recovered at the same time.

An activated carbon filter 36 may be arranged behind the condenser 34 in the direction of material flow; however, this is not necessary. It is also possible for an oxidation device 94 to be arranged behind the condenser 34 in the direction of flow, by means of which the remaining oxidisable material, especially from organic components of the electrolyte, are oxidised either catalytically or thermally such that the gas leaving the oxidation device 94 can be safely released into the atmosphere.

It is possible for the battery processing installation 52 to comprise a filling device 44, by means of which a transport container 46 can be filled with the dried comminuted material 24 in the form of the inactive comminuted material 42. However, it is also possible that the battery processing installation 52 does not have such a filling device 44.

The drying devices 26.1, 26.2 (it is also possible that the battery processing installation only has one drying device 26 in this embodiment) each comprise an exit airlock 96.1, 96.2 in the form of a rotary and deflection airlock. The inactive comminuted material 42 is temporarily stored, for example, in a silo 98 or directly fed into a heavy material separator 100. The heavy material separator 100 is designed to separate material with a density of at least 2.6 grams per cubic centimetre, particularly aluminium and/or iron components.

The remaining material is subsequently comminuted further in a comminutor 102 and then classified in a separator 62 into light material 108 (separator and coating material) and heavy material 110 (carrier foils and coating material). Both fractions are sieved 74.1, 74.2. This results in the development of the recyclable aluminium and copper foils in container 88.3, a separator fraction in container 88.1, and pure coating material in containers 88.4 and 88.2; due to its high degree of purity, this material can be processed further in subsequent metallurgic process steps.

REFERENCE LIST 10 battery
12 discharge unit
14 dismantling station
16 cell
18 comminution unit
19 liquid nitrogen source
20 shielding gas
22 shielding gas cylinder
24 comminuted material
26 drying device
27 airlock in front of comminutor
28 airlock
29 vacuum installation
30 vacuum pump
31 gas
32 gas purification device
34 condenser
36 activated charcoal filter
38 condensate container
40 control valve
41 agitator
42 inactive comminuted material
44 filling device
46 transport container
48 flushing line
50 pressurised gas cylinder
52 battery processing installation
54 standard container
56 first conveyor
58 second conveyor
60 breakdown comminutor
62 separator
64 transport container draining device
66 breakdown material
68 third conveyor
70 fourth conveyor
72 sifted material
74 classification device
76 active material fraction
78 transport container
80 carrier fraction
82 fifth conveyor 84 filling unit
86 container
88 additional filling unit
90 particle removal device
92 container
94 oxidation device
96 exit airlock
98 silo
100 heavy material separator
102 comminutor
108 light material
110 heavy material
p force

The invention claimed is:

1. A method for treating used lithium batteries, comprising:
   receiving, into a comminuting device, used lithium batteries that include a cathode, anode, separator, and electrolyte comprising a fluorine salt and a solvent, the solvent including an organic carbonate;
   comminuting the used lithium batteries, by the comminuting device, and obtaining comminuted material as a result; and
   inactivating the comminuted material and obtaining inactivated comminuted material as a result, wherein the inactivating includes a drying process, comprising drying the comminuted material by removal of organic carbonate from the electrolyte by vaporizing the organic carbonate at a pressure-temperature above a boiling point of the organic carbonate, the pressure being not more than 300 hPa, and the temperature being not more than 80° C. and lower than a decomposition temperature of the fluorine salt.

2. The method according to claim 1, wherein:
   the organic solvent comprises dimethyl carbonate, or ethyl methylcarbonate, or both; and
   the drying process further continues the drying until the vaporizing removes at least 90 percent by weight of the dimethyl carbonate, or ethyl methylcarbonate, or both, from the electrolyte.

3. The method according to claim 1, further comprising:
   capturing and condensing gases created from the vaporizing of organic carbonate in the electrolyte during the drying process.

4. The method according to claim 1, further comprising:
   performing the drying within an interior of a drying device;
   continuous monitoring, by a controller, of at least one progress parameter that is indicative of a progress of the drying, the at least one progress parameter comprising a pressure in the interior of the drying device or a pressure of a gas flow out of the interior of the drying device drying process, and
   not terminating the drying process until the progress parameter reaches a pre-determined progress parameter threshold value.

5. The method according to claim 1, wherein the
   the pressure is not more than 30 hPa for at least 50% of a duration of the drying, or the pressure does not exceed 50 hPa during the drying, or both.

6. The method according to claim 1, further comprising:
   feeding the comminuted material, through an airlock, into an interior of a drying device; and
   performing the drying within the interior of the drying device.

7. The method according to claim 6, further comprising:
   vacuum sucking away of gases created from vaporized organic carbonate during the drying process and/or
   wherein the batteries comprise current collector foils having a coating material and movement using the agitator is conducted such that at least 50% by weight of the coating material of comminuted material is sucked away.

8. The method according to claim 1 wherein:
   comminuting the used lithium batteries is performed within a container; and the drying is performed within the container.

9. The method according to claim 3 wherein condensing is performed at an ambient pressure, or condensing is performed at a temperature within a temperature range that extends from 0° C. to 50° C., or both.

10. The method according to claim 1, wherein comminuting of the used lithium batteries is configured such that the comminuted material includes components of comminuted material, and at least 90% by weight of the components of the comminuted material have a sieve size that is not more than 50 mm.

11. The method according to claim 1, wherein receiving the used lithium-ion batteries further includes receiving used lithium-ion batteries that further comprise carrier foil and binder that binds active material to the carrier foil, and
    the temperature of the vaporizing pressure-temperature being not more than 80° C., lower than a decomposition temperature of the binder, and lower than the decomposition temperature of the fluorine salt.

12. The method according to claim 11, further comprising a high temperature drying of the inactivated comminuted material, the high temperature drying being configured to decompose binder.

13. The method according to claim 1, further comprising:
    moving by an agitator, over a duration of the drying, a not yet inactivated comminuted material among the comminuted material, or a mixture of inactivated comminuted material and not yet inactivated comminuted material, or both; and
    supplying, during the drying, a vaporization heat to the comminuted material, wherein the supplying includes the agitator supplying at least 35% of said vaporization heat.

14. The method according to claim 1, further comprising:
    performing the drying within an interior of a drying device; and
    agitating, by an agitator, the inactivated comminuted material when removing the inactivated comminuted material from the drying device.

* * * * *